US008522315B2

(12) United States Patent
Zhang et al.

(10) Patent No.: US 8,522,315 B2
(45) Date of Patent: Aug. 27, 2013

(54) AUTOMATIC CONFIGURATION OF CLIENT TERMINAL IN PUBLIC HOT SPOT

(75) Inventors: Junbiao Zhang, Bridgewater, NJ (US); Saurabh Mathur, Plainsboro, NJ (US); Sachin Satish Mody, Lawrenceville, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1350 days.

(21) Appl. No.: 10/549,407

(22) PCT Filed: Mar. 12, 2004

(86) PCT No.: PCT/US2004/007806
§ 371 (c)(1),
(2), (4) Date: Sep. 14, 2005

(87) PCT Pub. No.: WO2004/084465
PCT Pub. Date: Sep. 30, 2004

(65) Prior Publication Data
US 2006/0173844 A1 Aug. 3, 2006

Related U.S. Application Data

(60) Provisional application No. 60/454,551, filed on Mar. 14, 2003.

(51) Int. Cl.
*H04L 29/06* (2006.01)
*H04W 4/00* (2009.01)
*G06F 11/00* (2006.01)
*H04L 1/00* (2006.01)
*H04L 12/26* (2006.01)
*H04L 12/28* (2006.01)

(52) U.S. Cl.
USPC ............... 726/4; 370/245; 370/338; 709/223; 709/229

(58) Field of Classification Search
USPC ............................................ 726/4
See application file for complete search history.

(56) References Cited

U.S. PATENT DOCUMENTS

2002/0076054 A1 6/2002 Fukutomi
2002/0157007 A1 10/2002 Sashihara
(Continued)

FOREIGN PATENT DOCUMENTS

WO WO0182037 A2 11/2001
WO WO 02/11391 2/2002

OTHER PUBLICATIONS

Search Report Dated Dec. 17, 2004.

*Primary Examiner* — Shin-Hon Chen
(74) *Attorney, Agent, or Firm* — Robert D. Shedd; Jerome G. Schaefer

(57) ABSTRACT

The invention herein provides an apparatus and a method for automatically configuring an IEEE 802.1x client terminal to provide limited access in a WLAN environment, specifically utilizing the access point to filter traffic associated with the limited access so as to redirect the client terminal's HTTP request to a designated local web server. The web server responds to the client terminal by requesting information required to establish an authorized communication. Thereafter the client terminal provides information required to establish an authorized communication. In the course of the communication the web server sends information such as transmission rates, new user account creation information, authentication method selection, and access user terms and conditions of acceptance, all typically required to establish an authorized access. The client responds with information, required to establish an authorized communication.

31 Claims, 3 Drawing Sheets

(56) References Cited

U.S. PATENT DOCUMENTS

| | | |
|---|---|---|
| 2002/0176366 A1 * | 11/2002 | Ayyagari et al. ............ 370/245 |
| 2003/0031154 A1 | 2/2003 | Kobayashi et al. |
| 2003/0051041 A1 | 3/2003 | Kalavade et al. |
| 2003/0169713 A1 * | 9/2003 | Luo ............................ 370/338 |
| 2003/0233580 A1 * | 12/2003 | Keeler et al. ................ 713/201 |
| 2004/0068668 A1 | 4/2004 | Lor et al. |
| 2004/0122960 A1 | 6/2004 | Hall et al. |
| 2004/0123153 A1 | 6/2004 | Wright et al. |

* cited by examiner 802.1X Client Configuration

AUTOMATIC CONFIGURATION OF CLIENT TERMINAL IN PUBLIC HOT SPOT

RELATED APPLICATION

This application claims the benefit, under 35 U.S.C. §365 of International Application PCT/US04/07806, filed Mar. 12, 2004, which was published in accordance with PCT Article 21(2) on Sep. 30, 2004 in English and which claims the benefit of United States provisional patent application No. 60/454,551, filed Mar. 14, 2003.

FIELD OF THE INVENTION

The invention provides an apparatus and a method in which a client terminal is automatically configured for access to a communications network, and in particular, a WLAN system automatically configures an IEEE 802.1x client on the wireless user device through the client web browser and an ActiveX control or a functionally equivalent plug-in. The IEEE 802.1x client configured in this manner is then able access with the WLAN system using the appropriate authentication parameters.

DESCRIPTION OF RELATED ART

The context of the present invention is the family of wireless local area networks or (WLAN) employing the IEEE 802.1x architecture having an access point (AP) that provides access for mobile devices and to other networks, such as hard wired local area and global networks, such as the Internet. Advancements in WLAN technology have resulted in the publicly accessible wireless communication at rest stops, cafes, libraries and similar public facilities ("hot spots"). Presently, public WLANs offer mobile communication device users access to a private data network, such as a corporate intranet, or a public data network such as the Internet, peer to peer communication and live wireless TV broadcasting. The relatively low cost to implement and operate a public WLAN, as well as the available high bandwidth (usually in excess of 10 Megabits/second) makes the public WLAN an ideal access mechanism, through which, mobile wireless communications device users can exchange packets with an external entity. However as will be discussed below, such open deployment may compromise security unless adequate means for identification and authentication exists.

When a user attempts to access service within a public WLAN coverage area, the WLAN first authenticates and authorizes user access, prior to granting network access. After authentication, the public WLAN opens a secure data channel to the mobile communications device to protect the privacy of data passing between the WLAN and the device. Presently, many manufacturers of WLAN equipment have adopted the IEEE 802.1x protocol for deployed equipment. Hence, the predominant authentication mechanism for WLANs utilize this protocol, which can be difficult to reconfigure for the average user.

The IEEE 802.1x protocol was designed with private LAN access as its usage model. Hence, the IEEE 802.1x protocol does not provide certain features that would improve the security in a public WLAN environment. For example IEEE 802.1x clients normally require complex configurations as by way of example, authentication methods, authentication server domain names, user names and passwords, that are complex and therefore can be difficult for users to understand. If a user attempts to access a new public hot spot, one or more of the parameters required for access user's device may require reconfiguration. In addition to gaining access, the 802.1x client may have to establish an account with the new public hot spot. As such the prior art does not establish such accounts in a transparent and seamless fashion, so as to make hot spot access cumbersome and impractical.

In the current web browser based authentication method, a mobile terminal communicates with a local or a remote authentication server, using a web browser operating with the Hyper Text Transfer Protocol Secured Sockets (HTTPS) protocol to insure that anyone on the path between the mobile terminal and the authentication server cannot trespass upon or steal confidential user information. However, the only information the authentication server has related to the mobile terminal is its IP address. A practical solution to reconfiguring a client requires that it operate within the standards established by the 802.1x protocol. However, the inventors have discovered a means that modifies the behavior within the restrictions of the protocol, by filtering traffic, such that the user is allowed access to the network rather than experiencing a block, which would prevent the further automatic reconfiguration to achieve authentication.

SUMMARY OF THE INVENTION

The method of the present invention provides for automatic configuration of a client terminal to access a communications network. In particular, the method according to the invention utilizes IEEE 802.1x, the adopted protocol for secure IEEE 802.11 wireless access, for authentication. Furthermore, a web browser together with an ActiveX control or plug-in for natural user interactions may include, among other things, the creation of user accounts, the selection of which accounts to use, and the acceptance of access terms. As the result of the user interactions, IEEE 802.1x client parameters are automatically configured according to user choices, and permit a secure authentication based on the IEEE 802.1x protocol.

The invention herein provides a method for automatically configuring an IEEE 802.1x client terminal to provide secure access in a wireless local area network environment comprising the steps of filtering traffic associated with an HTTP request from the client terminal for access to the wireless network redirecting the HTTP request to a designated web server, and issuing a request from the designated web server to the client terminal for information required to establish an authorized communication. Thereafter, the client terminal provides the web server information required to establish an authorized communication. In the course of the communication, the web server indicates to the client terminal information corresponding to such parameters as transmission rates, user account requirements, authentication method selection information, new account creation procedures, and user terms and conditions which are all typically required to establish an authorized communication. The client terminal user responds accordingly with web server access rate information, web server user account creation information, user access authentication method selection information, and user acceptance of the offered service required to establish an authorized communication.

The method further comprises the step whereby the web server responds to the client terminal utilizing a plug-in control such as an ActiveX control to communicate information required to establish an authorized communication. The client terminal thereafter reconfigures its terminal to establish secure access to the network.

The present invention also includes one or more apparatus that cooperate in providing a secure communications session between a client terminal $140_n$ and a WLAN. The client terminal requests access to the WLAN through an access means. The WLAN processes the request sending it to a packet filter that redirects the client to a designated web server. The web server responds by providing provider list web pages, which are processed by means where the user inputs its selection and sends the client terminal access information. The web server responds by sending an ActiveX Control to configure the client terminal utilizing a means for activating, in response to the information received from the client terminal, a software module that reconfigures the client terminal and establish an authorized communication. Thereafter the client access means permits authenticated access to pass through the WLAN. The WLAN provides a means for authenticating the reconfigured client terminal and allows access to the WLAN in response to the authentication using appropriate parameters associated with a configuration arrangement selected by a user.

BRIEF DESCRIPTION OF THE DRAWINGS

The invention is best understood from the following detailed description when read in connection with the accompanying drawing. The various features of the drawings are not specified exhaustively. On the contrary, the various features may be arbitrarily expanded or reduced for clarity. Included in the drawing are the following figures.

DETAILED DESCRIPTION OF THE INVENTION

In the figures to be discussed, the circuits and associated blocks and arrows represent functions of the process according to the present invention, which may be implemented as electrical circuits and associated wires or data busses that transport electrical signals. Alternatively, one or more associated arrows may represent communication (e.g., data flow) between software routines, particularly when the present method or apparatus of the present invention is implemented as a digital process.

When a user operating a terminal incorporating the IEEE 802.1x protocol ("client terminal" or simply "IEEE 802.1x client") attempts to access a public WLAN at a hot spot, the IEEE 802.1x client terminal would begin the authentication process according to its current machine configuration. Often the user terminal is not configured for access at a particular hot spot (e.g. it could be configured for office use, or the user may not have an account that permits access to a particular hot spot). The user opens its browser and attempts to access the network. With a modified behavior of the WLAN access point in accordance with the present invention, the user requests are redirected to a local web server, also referred to as an HTTP server. The web server in response sends the terminal various requirements that must be fulfilled to establish access to the network. If the user fulfills the requirements the web server authorizes access.

The typical sequence proceeds with the web server providing a greeting page that contains a list of service providers that the user may desire to use for authentication and charging. Selecting one of the providers would activate the ActiveX control/plug-in on the user's terminal. When the required parameters are specified by the terminal the user will be successfully authenticated by the service provider. Using these parameters, the ActiveX control/plug-in configures the IEEE 802.1x client and restarts the authentication process. The user is thereafter successfully authenticated and the WLAN AP fully opens access to the user. If the user does not have any existing accounts that would permit authentication, the greeting page also allows the user to create a new account. Upon creation of the account, the ActiveX control/plug-is activated to allow the reconfiguration of the terminal to proceed.

Figure 1:
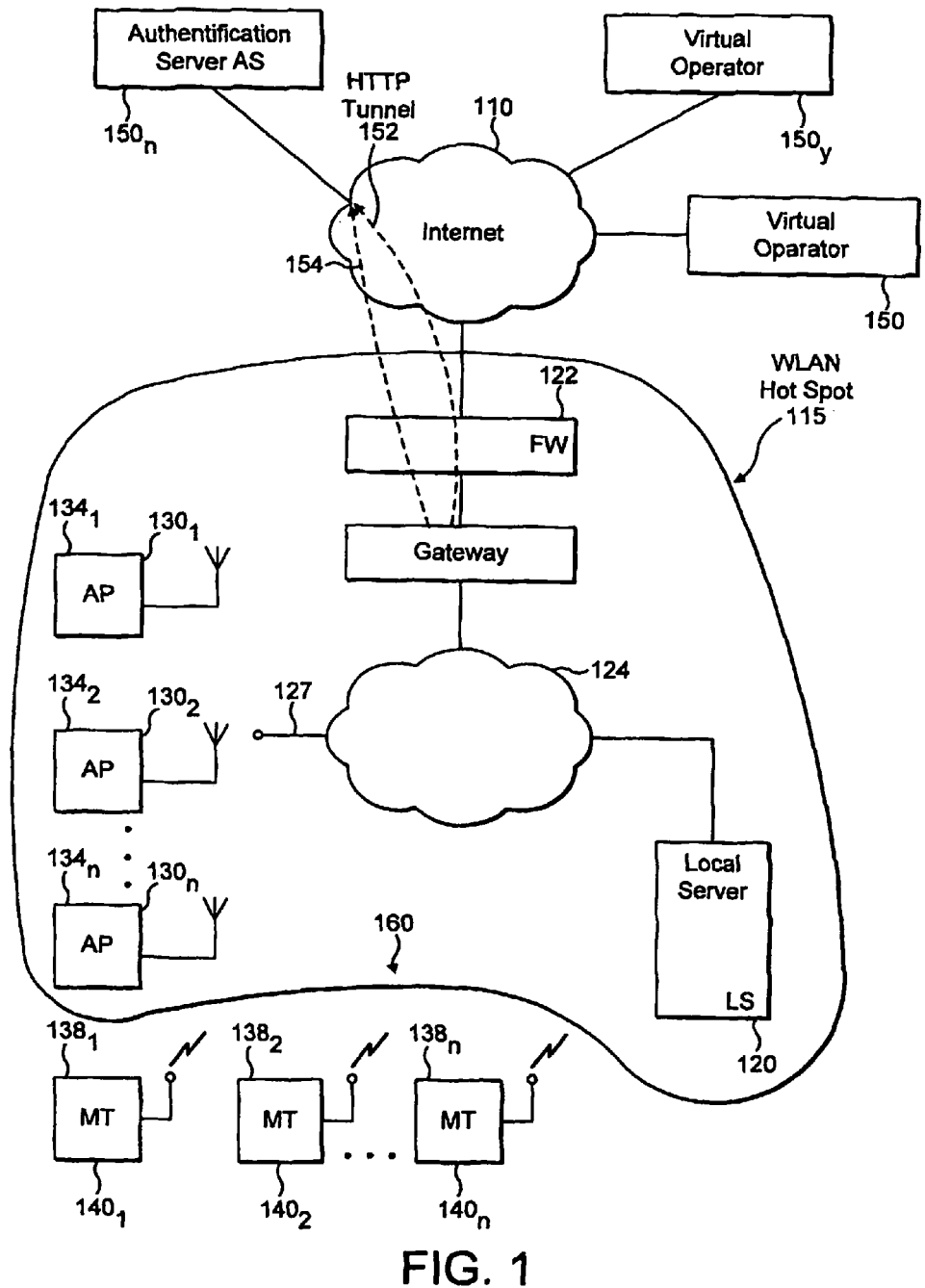
FIG. 1 is a block diagram of a communications system for practicing the method of the present principles for authenticating a mobile wireless communications device.

In accordance with FIG. 1, one or more mobile terminals represented by $140_1$ through $140_n$ communicate over a wireless medium 124 through an access point (AP) through $130_n$, local computer 120, which may be utilized as the HTTP server 120 (FIG. 2), in association with firewalls 122 and one or more virtual operators $150_{1-n}$, such as authentication server $150_n$. Communication from terminals $140_{1-n}$ typically require accessing a secured data base or other resources, utilizing the Internet 110 and associated communication paths 154 and 152 that require a high degree of security from unauthorized entities, such as would be hackers.

As further illustrated in FIG. 1, the WLAN architecture encompasses several components and services that interact to provide station mobility transparent to the higher layers of a network stack. The AP stations such as access points $130_{1-n}$ and mobile terminals $140_{1-n}$ as the components connect to the wireless medium and typically contain the functionality of the IEEE 802.1x protocols, that being MAC (Medium Access Control) $134_{1-n}$, and corresponding PHY (Physical Layer) (unshown), and a connection 127 to the wireless media. Communication functions and protocols are implemented in the hardware and software of a wireless modem or a network access or interface card. This invention proposes a method for implementing a means in the communication stream, such that an access point $130_n$ improves the authentication of a terminal device in a WLAN environment, and remain within the compatibility requirements of a IEEE 802.1x WLAN MAC layers for downlink traffic (i.e. from the an authentication server to the mobile terminal such as a laptop) as it may participate in the authentication of one or more wireless mobile devices $140_{1-n}$, a local server 120 and a virtual operator such as the server 150.

In accordance with the principles of the present invention, an access 160 enables each mobile terminals $140_{1-n}$, to securely access a WLAN 115 by authenticating both the mobile terminal itself, as well as its communication stream in accordance with the IEEE 802.1x protocol or other optional protocol as the terminal $140_n$ may choose. The manner in which the access 160 enables such secure access can best be understood by reference to FIG. 2, which depicts the sequence of interactions that occurs among a mobile wireless communication device, say mobile terminal $140_n$, the public WLAN 115, and a HTTP server $120_n$. When configured with the IEEE 802.1x protocols, the access point $130_n$ of FIG. 1 maintains a controlled port and an un-controlled port, through which the access point exchanges information with the mobile terminal $140_n$. The controlled port maintained by the access point $130_n$ serves as the entryway for non-authentication information, such as data traffic, to pass through the access point $130_n$ between the WLAN 124 and the mobile terminals $140_n$. Ordinarily, the access point $130_n$ keeps the respective controlled port closed in accordance with the IEEE 802.1x protocol, until authentication of the mobile wireless communications device. The access points $30_n$ always maintains the respective uncontrolled port open to permit the mobile terminals $140_n$ to exchange authentication data with the local server $150_n$.

Figure 2:
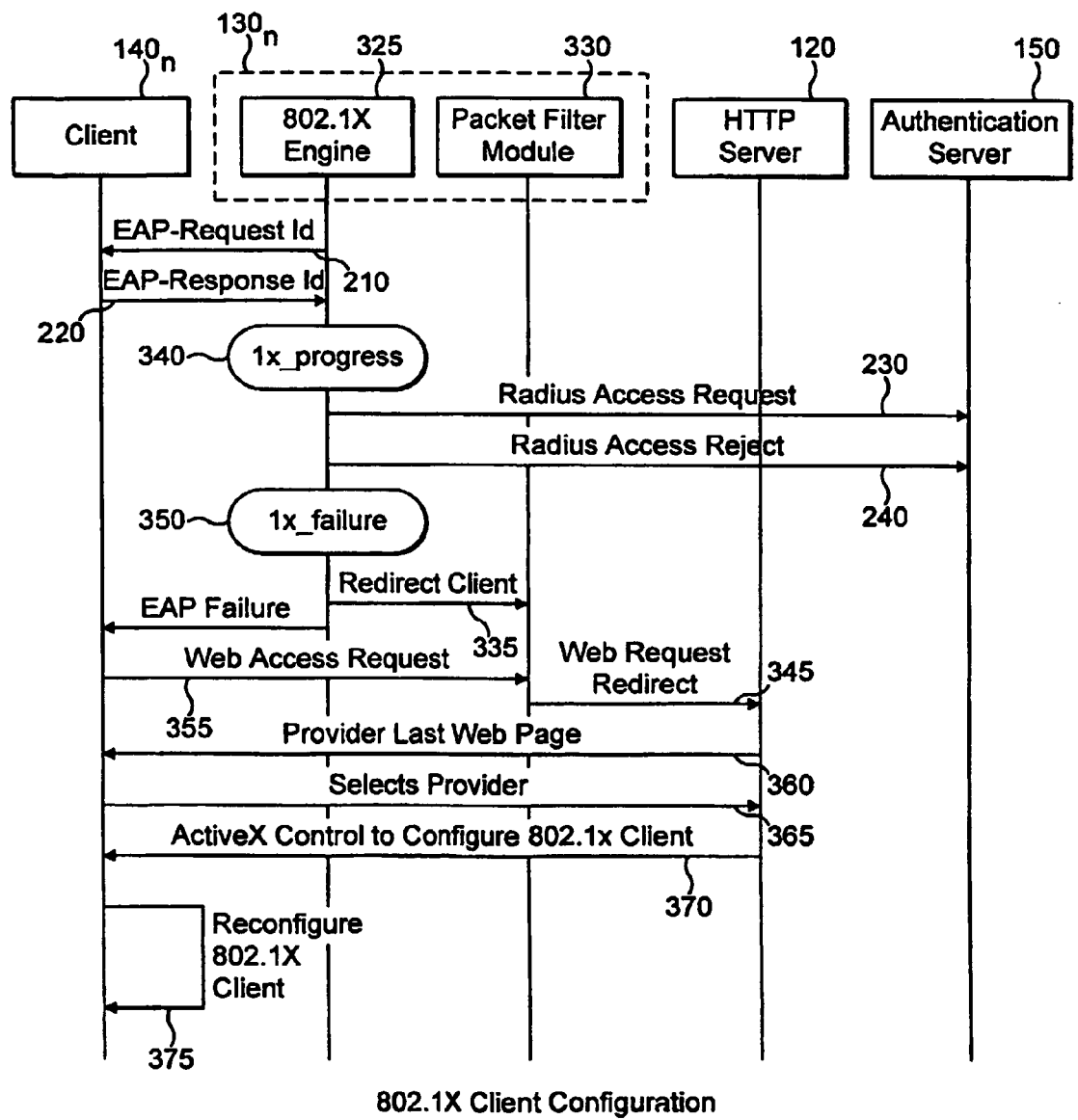
FIG. 2 is a flow diagram of the inventive method of establishing authentication when the IEEE 802.1x protocol.

The access point includes an IEEE 802.1X engine 325, which is a module that implements the IEEE 802.1X protocol with the determining means necessary to carry out the steps of the present invention. The WLAN 115 system must maintain proper state information for the system to function properly. Such state information will be provided by the access point 130$_n$ IEEE 802.1x engine, which is used by, among other things, the packet filtering function 330 and the HTTP server 120. With reference to FIG. 2, a further embodiment of the present invention is the utilization of the access point 130$_n$ to create several operational states. Following a Response-Identity EAP packet 220 a state 1x_progress 340 indicates that the mobile terminal 140$_n$ is an IEEE 802.1x client and the IEEE 802.1x authentication process is ongoing. Such means to select from one or more available security protocols is well known by those skilled in the art of programming and engineering in a WLAN environment. The IEEE 802.1X engine 325 is therefore responsible for client detection and providing the client capability information to other modules of the system. In addition, it also implements RADIUS client functionality to convert EAP messages to RADIUS messages, forwarding such messages in the form of a radius access request 230 and responding to radius access reject messages 240. The packet filter module 330 is responsible for filtering packets based on the criteria set by other modules.

In the event, a EAP-Response-Identity packet 220 results in a state 1x_failure 350 because, as by way of example, the client is not properly configured, the client would be redirected to the local HTTP server 120 to attempt a reconfiguration of the client. More particularly, FIG. 2 illustrates an embodiment of the method of the present invention wherein the access point 130$_n$ detects that the mobile terminal 140$_n$ is not an authenticated IEEE 802.1x client, and a redirected client 335 moves the process to thereby configure through an IP packet filter module 330 and move the process to the HTTP server 120 via a web request redirect 345. Alternatively, mobile terminal 140$_n$ may send a direct web access request 355, which is redirected by the packet filter module 330 to the HTTP server 120. When the HTTP server 120 receives a web redirect request 345 it responds by presenting the mobile terminal 140$_n$ with information 360, such as a provider list web page, specifically related to the browser based authentication.

In the case where the access point 130$_n$ detects that the terminal device is an IEEE 802.1x client, it permits normal IEEE 802.1x protocol communication exchanges to proceed through the access point 130$_n$ and sets up appropriate IP packet filtering through IP filter module 330 and requisite state information for the HTTP server 120 to control the mobile terminal 140$_n$ user access during and after the IEEE 802.1x based authentication process.

The invention herein provides a method for automatically configuring a IEEE 802.1x client terminal to provide secure access in a wireless local area network 115 comprising the steps of an access point 130$_n$ filtering traffic 330 associated with an HTTP request from the client terminal for access to the wireless network redirecting the HTTP to a designated web server 120, and issuing a request from the designated web server to the client terminal 140$_n$ for information 360 required to establish an authorized communication. Thereafter the client terminal 140$_n$ provides the web server information 365 such as the provider selected, to establish an authorized communication. In the course of the communication the web server 120 indicates to the client terminal 140$_n$ information corresponding to such parameters as transmission rates, user account creation information, authentication method selection information, new account creation procedures, access user terms and conditions of acceptance, all typically required to establish an authorized communication. The client terminal 140$_n$ user responds 365, accordingly communicating web server 120 access rate information, web server user account creation information, user access authentication method selection information, and user access terms and conditions of acceptance information required to establish an authorized communication. The HTTP server 120 invokes 370 a plug-in such as an ActiveX control plug to assist the terminal 140$_n$ in reconfiguring 375 the terminal 140$_n$.

Figure 3:
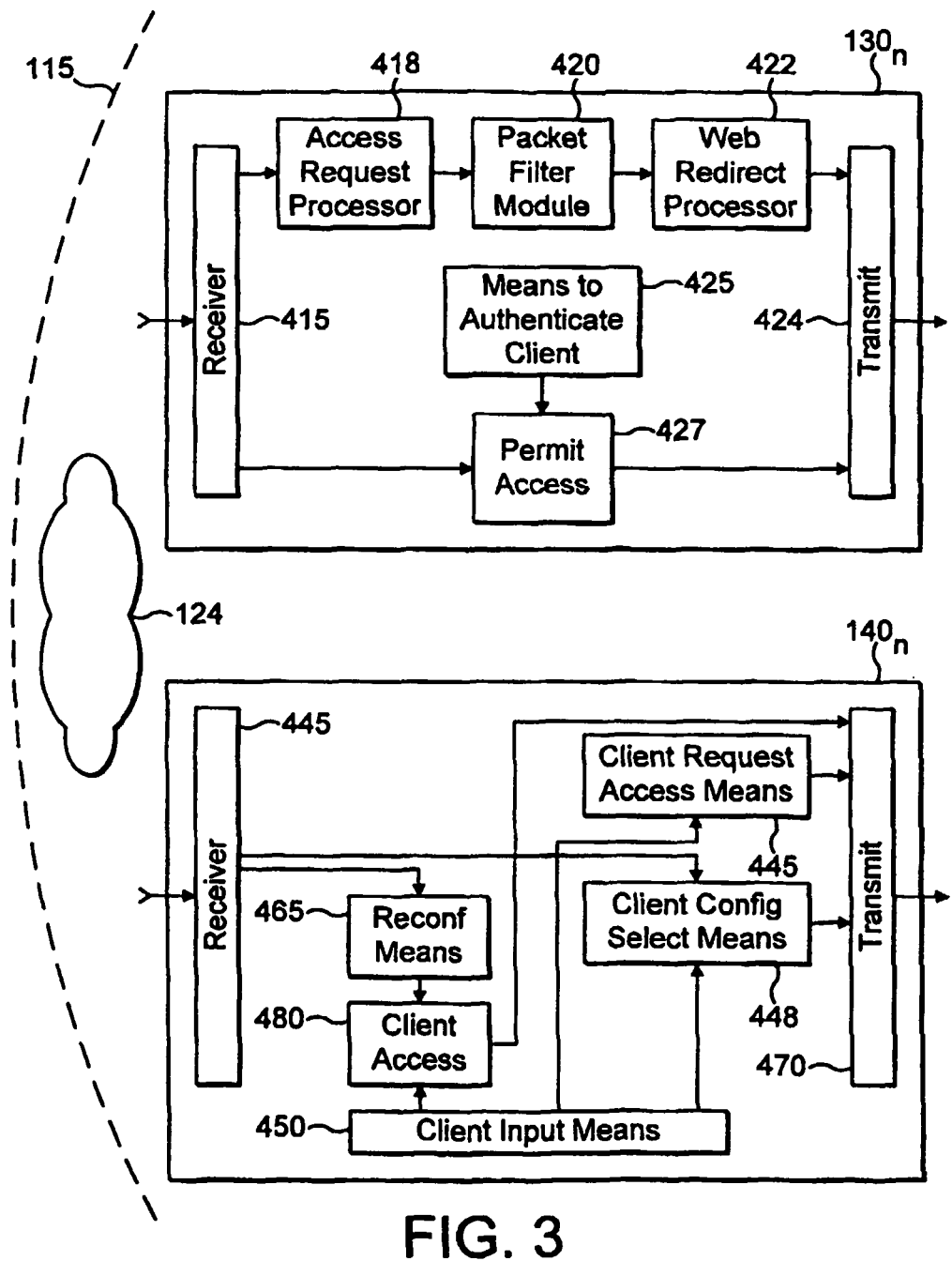
FIG. 3 is a block diagram of an apparatus for implementing the present invention.

In referring to FIG. 3, the present invention also includes an apparatus for providing a secure communications session between a client terminal 140$_n$ and a WLAN 115. The client terminal 140$_n$ requests through means 445 access to the WLAN 115 through the access point 130$_n$ receiver 415, which processes the request through means 418 and sends the request to a packet filter 420 that redirects the client to a designated web server via transmit means 424. The web server responds to the client terminal 140$_n$ by providing provider list web pages, which are processed by means 448 where the user inputs its selection through a means 448 and sends the client terminal 140$_n$ access information through transmit means 470. The web server responds by sending an ActiveX Control to configure the client terminal 140$_n$ utilizing a means 465 for activating, in response to the information received from the client terminal, a software module that reconfigures the client terminal and establish an authorized communication. Thereafter the client access means 480 permits authenticated access to pass through the WLAN 115. The access point 130$_n$ provides a means for authenticating the reconfigured client terminal and allows access to the WLAN in response to the authentication using appropriate parameters associated with a configuration arrangement selected by a user.

The access point 130$_n$ for providing a secure communications session between the client terminal a 140$_n$ and the WLAN 115, comprises a means for receiving an access request 418 from the terminal 140$_n$; a means for redirecting the access request 420,422 to a local web server.

In response to the access request the terminal 140$_n$, information required to establish terminal 140$_n$ access to the WLAN 115; the terminal 140$_n$ is provided web page options. The client terminal select through means 448 the desired configuration.

In response to the information received from the client terminal 140$_n$, the web server sends a configuration and the client terminal processes the configuration utilizing a means for activating 465, comprising a software module that reconfigures the client terminal 140$_n$ for authentication, using appropriate parameters associated with a configuration arrangement selected by a user; and a means for authenticating 425 the reconfigured client terminal 140$_n$ and allowing access to the WLAN 115 in response to the authentication.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

We claim:
1. A method for enabling a client terminal to access a wireless network, comprising:
    receiving an access request from the client terminal;
    redirecting the access request to a local web server via a packet traffic filter for filtering packet traffic;

requesting from the client terminal, information to establish client terminal access to the wireless network;

activating, in response to the client terminal access information received from the client terminal, a module that reconfigures the client terminal for authentication using appropriate parameters associated with a configuration arrangement selected by a user; and authenticating the reconfigured client terminal and allowing access to the wireless network in response to the authentication.

2. The method according to claim 1, wherein the wireless network is an IEEE 802.11 compliant wireless local area network (WLAN), and the client terminal is an IEEE 802.1x compliant client terminal.

3. The method according to claim 2, wherein the activating step comprises activating an ActiveX control/plug-in installed on the client terminal.

4. The method according to claim 2, wherein the activating step comprises downloading to, and activating in, the client terminal an ActiveX control/plug-in.

5. The method as recited in claim 1, the method further comprising creating a plurality of operational states including a progress state and a failure state, said packet traffic filter receiving wireless local area network failure state information via a redirect client message and moves a reconfiguration process to said local web server via a web request redirect message.

6. The method according to claim 1, further comprising:

detecting a state failure responsive to receipt of an EAP response identity packet and to receipt of a RADIUS access request reject message; and redirecting the access request to a local web server via said packet traffic filter responsive to one of the packet traffic filter receiving a redirect client request and of receiving a web access request from said client terminal after detection of said state failure.

7. The method according to claim 1 wherein said information to establish client terminal access to the wireless network comprises provider selection information responsive to receipt of a provider list web page at the client terminal from said local web server.

8. An access point for providing a secure communications session between a client terminal and a wireless network, comprising:

means for receiving an access request from the client terminal;

means for redirecting the access request to a local web server for allowing a reconfigured access to the wireless network via a packet filter means for filtering packet traffic, means for requesting from the client terminal, information to establish client terminal access to the wireless network;

means for activating, in response to the client terminal access information received from the client terminal, a software module that reconfigures the client terminal for authentication using appropriate parameters associated with a configuration arrangement selected by a user; and means for authenticating the reconfigured client terminal and allowing access to the wireless network in response to the authentication.

9. The access point according to claim 8, wherein the access point complies with the IEEE 802.11 standards and the client terminal is an IEEE 802.1x compliant client terminal.

10. The access point as recited in claim 8, the access point creating a plurality of operational states including a progress state and a failure states wherein said packet traffic filter means receives wireless local area network failure state information via a redirect client message and moves a reconfiguration process to said local web server via a web redirect message.

11. The access point according to claim 8, further comprising:

an IEEE 802.1x engine for converting the access request to a RADIUS message, for responding to a RADIUS access reject message and for detecting a state failure; and said packet traffic filter means redirecting the access request to a local web server responsive to one of the packet traffic filter means receiving a redirect client request from said IEEE 802.1x engine and of receiving a web access request from said client terminal after the IEEE 802.1x engine detecting said state failure.

12. The access point according to claim 8 wherein said information to establish client terminal access to the wireless network comprises provider selection information responsive to receipt of a provider list web page at the client terminal from said local web server.

13. A method for configuring a client terminal to provide secure access in a wireless network, comprising:

filtering traffic associated with a request from the client terminal for access to the wireless network, at a packet traffic filter for filtering packet traffic;

redirecting the access request to a designated web server, via said packet traffic filter for filtering packet traffic; and issuing a provider list web page and a request from the designated web server to the client terminal for provider selection information to establish an authorized communication.

14. The method according to claim 13, wherein the wireless network is an IEEE 802.11 compliant wireless local area network and the client terminal is an IEEE 802.1x compliant client terminal.

15. The method according to claim 14, whereby authentication is browser based and the method further comprising sending an ActiveX control to configure the client terminal, a software module of said client terminal reconfiguring the client terminal and establishing said authorized communication.

16. The method according to claim 13, further comprising the designated web server receiving from the client terminal said provider selection information for establishing said authorized communication.

17. The method according to claim 16, further comprising the client terminal receiving information corresponding to parameters from the designated web server and including transmission rate information for establishing said authorized communication.

18. The method according to claim 17, further comprising the client terminal communicating to the designated web server access rate information for establishing said authorized communication.

19. The method according to claim 16, further comprising the client terminal receiving information corresponding to parameters from the designated web server including user account creation information for establishing said authorized communication.

20. The method according to claim 19, further comprising the client terminal communicating web server user account creation information to the designated web server for establishing said authorized communication.

21. The method according to claim 16, further comprising the client terminal receiving information corresponding to parameters from the designated web server including authentication method selection information for establishing said authorized communication.

22. The method according to claim 21, further comprising the client terminal communicating user access authentication method selection information to the designated web server for establishing said authorized communication.

23. The method according to claim 16, further comprising the client terminal receiving information corresponding to parameters from the designated web server including new account creation procedures for establishing said authorized communication.

24. The method according to claim 16, further comprising the client terminal receiving information corresponding to parameters from the designated web server including access user terms and conditions of acceptance information for establishing said authorized communication.

25. The method according to claim 24, further comprising the client terminal communicating user access terms and conditions of acceptance information for establishing said authorized communication.

26. The method according to claim 16, whereby authentication is browser based and related to said provider list web page and the method further comprising invoking an ActiveX control to reconfigure the client terminal.

27. The method according to claim 13, further comprising:
detecting a state failure responsive to receipt of an EAP response identity packet and to receipt of a RADIUS access request reject message; and
redirecting the access request to said designated web server via said packet traffic filter responsive to one of the packet traffic filter receiving a redirect client request and of receiving a web access request from said client terminal after detection of said state failure.

28. A mobile terminal, comprising:
means for receiving an extended authentication protocol request identification message packet;
means for forwarding an extended authentication protocol response identity message packet;
means for receiving an extended authentication protocol failure message packet;
means for forwarding a web access request via a packet traffic filter for filtering packet traffic as a web request redirect message;
means for receiving a provider list web page;
means for selecting a provider and means for forwarding selected provider information to a designated web server;
means for receiving an ActiveX control/plug-in from the designated web server to reconfigure said mobile terminal; and
means for reconfiguring said mobile terminal and establishing authorized communications.

29. The mobile terminal according to claim 28 wherein said provider list web page and said ActiveX control/plug-in are received from a local web server in response to receipt of a web request redirect message from an access point.

30. An access point associated with a communications network, comprising:
means for forwarding an extended authentication protocol request identification message packet to a client terminal;
means for receiving an extended authentication protocol response identity message packet from the client terminal;
means for forwarding an extended authentication protocol failure message packet to the client terminal responsive to a state failure;
means for receiving a re-direct client request from said forwarding means at a packet filter module responsive to said state failure;
alternative means for receiving a request for access to a communications network at said packet filter module responsive to said state failure; and
means for forwarding a web request redirect from said packet filter module to a designated web server for establishing authorized communications following receipt of selected provider information at the designated web server and successful client terminal reconfiguration responsive to authentication.

31. The access point according to claim 30 wherein said designated web server transmits an ActiveX control/plug-in for configuring the client terminal responsive to the receipt of selected provider information at the designated web server.

* * * * *